March 16, 1943.  O. P. R. LEHMANN ET AL  2,313,828
CAP MARKING MECHANISM FOR CONTAINER CAPPING MACHINES
Filed Jan. 10, 1941  4 Sheets-Sheet 1

Inventors
O. P. R. Lehmann,
R. N. Bostock,
By Wolhaupter & Groff
Attorneys

March 16, 1943. O. P. R. LEHMANN ET AL 2,313,828
CAP MARKING MECHANISM FOR CONTAINER CAPPING MACHINES
Filed Jan. 10, 1941  4 Sheets-Sheet 2

Inventors
O. P. R. Lehmann,
R. N. Bostock,
By Wolhaupter & Groff
Attorneys

March 16, 1943.　　O. P. R. LEHMANN ET AL　　2,313,828
CAP MARKING MECHANISM FOR CONTAINER CAPPING MACHINES
Filed Jan. 10, 1941　　4 Sheets-Sheet 3
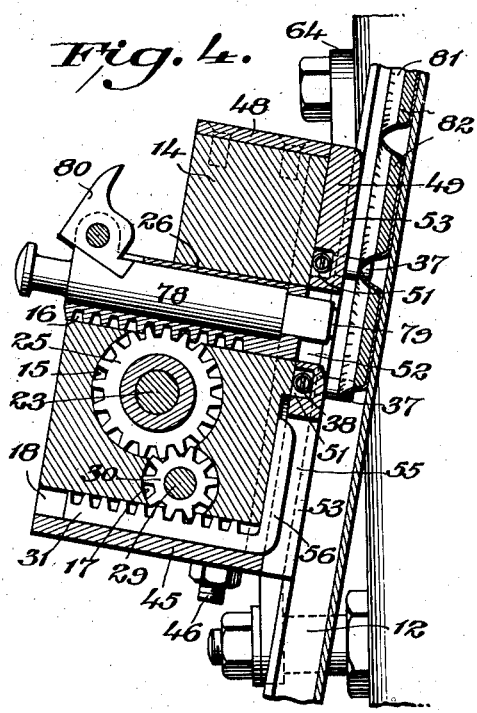
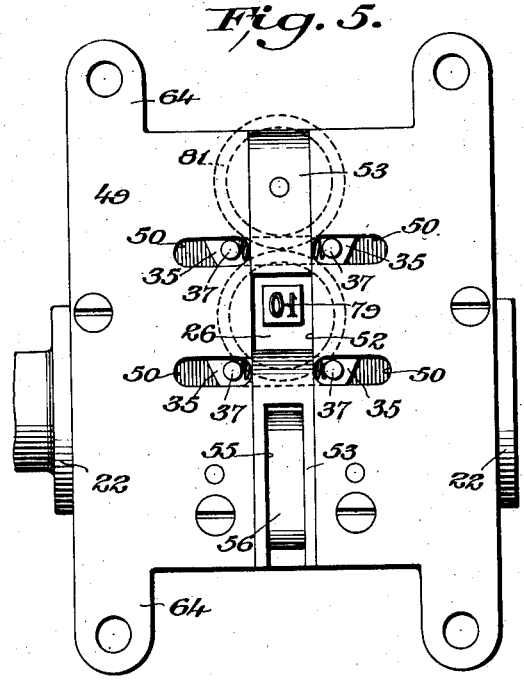
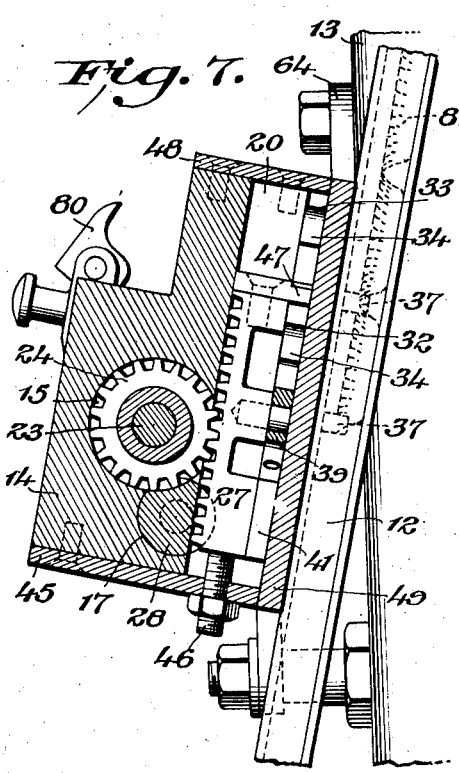
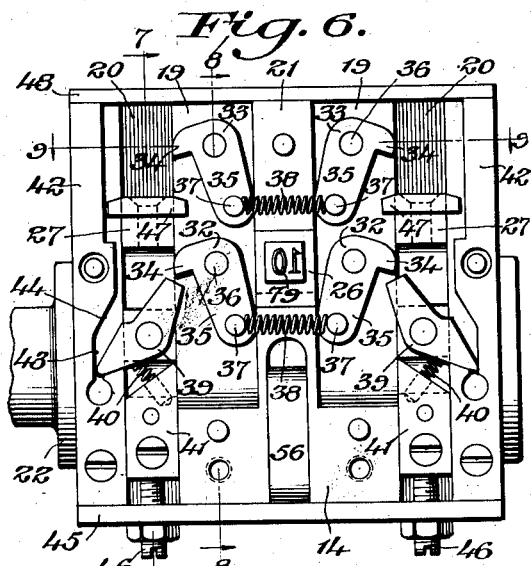
Inventors
O. P. R. Lehmann,
R. N. Bostock,
By Wolhaupter & Groff
Attorneys March 16, 1943. O. P. R. LEHMANN ET AL 2,313,828
CAP MARKING MECHANISM FOR CONTAINER CAPPING MACHINES
Filed Jan. 10, 1941 4 Sheets-Sheet 4
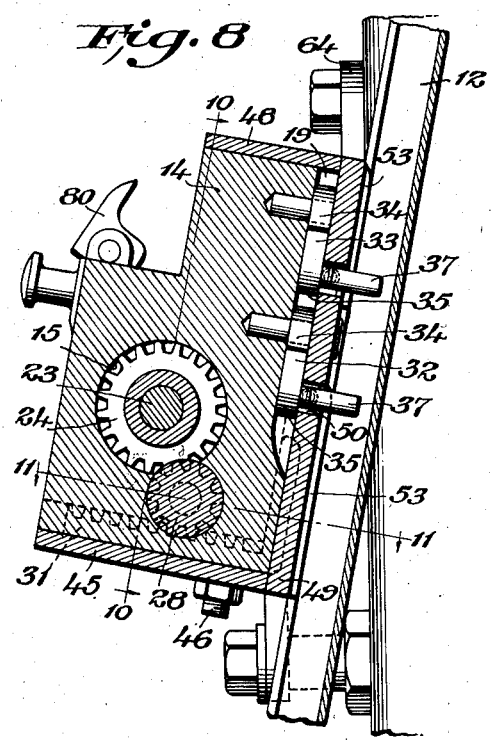
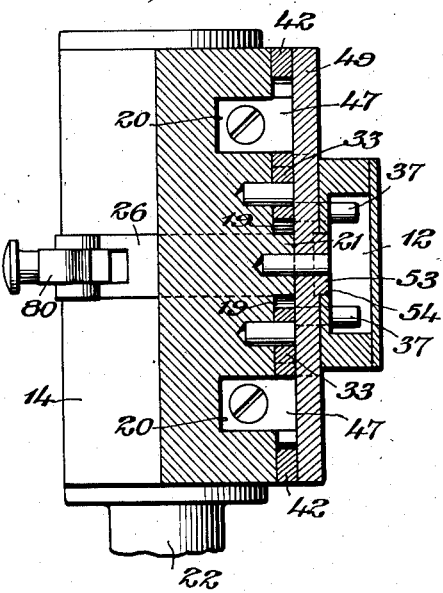
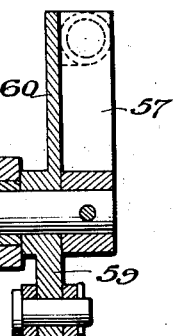
Inventors
O.P.R. Lehmann,
R.N. Bostock,
By Wolhaupter & Groff
Attorneys Patented Mar. 16, 1943

2,313,828

UNITED STATES PATENT OFFICE 2,313,828

CAP MARKING MECHANISM FOR CONTAINER CAPPING MACHINES

Otto P. R. Lehmann, East Orange, and Raymond N. Bostock, Upper Montclair, N. J., assignors to P. Ballantine & Sons, Newark, N. J., a corporation of New Jersey Application January 10, 1941, Serial No. 374,000

9 Claims. (Cl. 226—68)

This invention relates to a mechanism for marking machine products to enable identification of the machine which produced any given product and of the person in charge of the machine when the given product was produced, and has particular reference to a mechanism for use in association with bottle and can filling and capping machines to apply to the caps handled by each such machine a mark by which the particular machine which filled and capped any given bottle or can, as well as the particular person in charge of the machine at the time the given bottle or can was filled and capped, may subsequently be identified.

In many instances, a battery of machines may be employed to fill and cap bottles or cans and at different times any or all of these machines may be in charge of different persons. Among a battery of such machines there may be one or more which is operating imperfectly, with the result that the bottled or canned goods do not reach the consumer in proper condition. For example, in the case of goods such as fermented or carbonated beverages, it is necessary that the bottle or can caps be applied air tightly as otherwise the beverage, when it reaches the consumer, will be in a "flat" condition. On the other hand, some imperfection in the filling mechanism of any particular machine may result in bottles or cans reaching the consumer in unsatisfactory condition even though the caps may be properly applied.

When a bottle or can reaches the consumer in unsatisfactory condition a complaint usually is lodged. There then devolves upon the producer the task of ascertaining the cause of the goods being received in unsatisfactory condition and of correcting the cause. This task is greatly simplified if the cap of the unsatisfactory bottle or can contains a mark indicative of the particular machine by which the bottle or can was filled and capped and of the person in charge of the machine when the unsatisfactory bottle or can was filled and capped, as thereby the search for the cause of the goods being received in unsatisfactory condition is narrowed to a single machine and person.

Accordingly, the primary object of the present invention is to provide a mechanism for use in association with bottle or can filling and capping machines to apply to the caps handled by each such machine a distinctive mark by which the machine, as well as the particular person in charge of the same when any given bottle or can was filled and capped may readily be identified.

Other special and important objects of the invention are: to provide a mechanism for the purpose stated which is of simple construction; which may readily be applied to known types of capping machines without any necessity of material alterations or additions thereto, and which is thoroughly reliable and efficient in operation.

With the foregoing and various other objects in view, which will become more fully apparent as the nature of the invention is better understood, the same consists in the novel combination of the mark applying mechanism with a capping machine, and in the novel features of construction, combination and arrangement of parts of the mechanism itself, as will be hereinafter more fully described, illustrated in the accompanying drawings and defined in the appended claims.

In the accompanying drawings, wherein like characters of reference denote corresponding parts in the different views:

Figure 4 is a central, vertical, longitudinal section through the cap marking mechanism.

Figure 5 is a rear elevation of the cap marking mechanism removed from the capping machine.

Figure 6 is a rear elevation of the cap marking mechanism with the rear cover and mounting plate thereof removed.

Figure 7 is a vertical, longitudinal section on the line 7—7 of Fig. 6.

Figure 8 is a vertical, longitudinal section on the line 8—8 of Fig. 6.

Figure 9 is a horizontal section on the line 9—9 of Fig. 6.

Figure 10 is a vertical, transverse section on the line 10—10 of Fig. 8.

Figure 1:
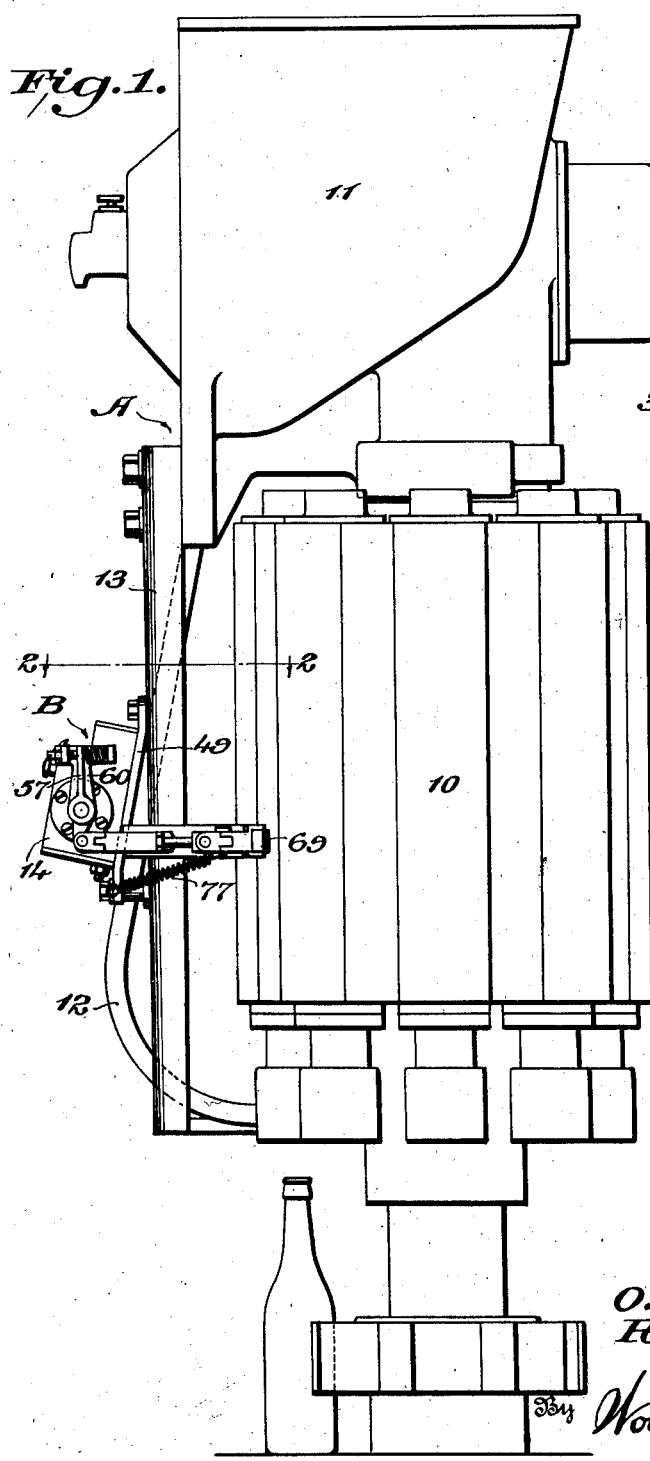
Figure 1 is a side elevation of a capping machine of a well known type having operatively associated therewith a cap marking mechanism constructed in accordance with one practical embodiment of the invention.
Figure 11:
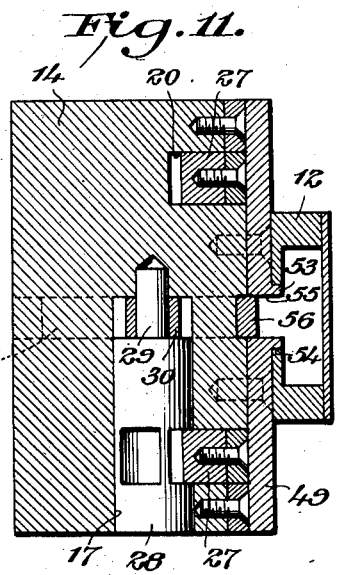
Figure 11 is a horizontal section on the line 11—11 of Fig. 8.
Figure 12:
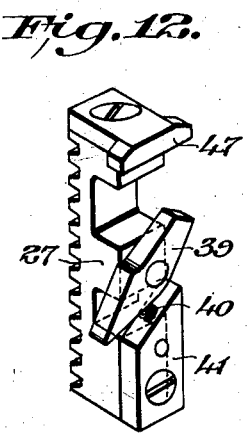
Figure 12 is a perspective view of one of the rack bar units of the cap marking mechanism.

Referring to the drawings in detail, A designates, generally, a machine of a well known type for applying closure caps to bottles or cans and B designates, generally, the present mechanism for marking the caps handled by the machine A.

The capping machine A includes, as usual, an annular series of capping heads 10 which are intermittently rotatable as a unit to bring the heads successively into capping position; a hopper 11 to contain the caps to be applied to the bottles or cans which are understood to be fed successively to capping position by means with which the invention is not concerned and which therefore are not illustrated; a chute 12 through which the caps gravitate from the hopper 11 to a position to be applied by the capping heads 10 to the bottles or cans, and a chute-supporting bracket 13 depending from the hopper 11.

The machine A includes, of course, various cooperating parts whereby the capping heads 10 perform their function of applying caps to the bottles or cans, but as the present invention is not concerned with the details of said machine, same is illustrated only conventionally in order to illustrate the application thereto of the cap marking mechanism with which the present invention primarily is concerned. Moreover, it will be understood that the machine illustrated is only one of a number of specifically different machines of the same general type to which the present cap marking mechanism is applicable.

Referring now in detail to the cap marking mechanism B, it will be observed that the same includes a substantially rectangular metal block 14 of suitable height, width and thickness having formed therethrough, from side to side thereof, a gear wheel-accommodating bore or chamber 15 and also having formed therethrough, from front to rear thereof, a marking element-accommodating bore 16 of preferably rectangular cross section, which is located midway between the sides of said block and above the bore 15 and in intersecting relationship at its bottom with the top of said bore 15.

Also formed in the block 14, below and parallel to the bore 15 and in intersecting relationship at its top with the bottom of said bore 15, is a second gear wheel-accommodating bore 17, while formed in the bottom of said block, midway between its sides and extending from front to rear thereof, is a rack-bar-accommodating channel 18.

Additionally, the block 14 has formed therein a pair of vertically disposed cap holding dog-accommodating recesses 19, 19 and a pair of vertically disposed rack bar-accommodating recesses 20, 20. These recesses and channels open through the rear face of the block 14 and said recesses are of lesser depth than said channels and are disposed to either side of a central, vertical rib 21 which they form, while said channels are disposed outwardly with respect to said recesses, respectively, and are located near the sides of the block 14.

In the ends of the bore 15 are mounted bearing members 22 and in said bearing members is journaled a rotatable shaft 23 upon which are mounted a pair of spur gears 24, 24 and, between the latter, a third spur gear 25. these gears being formed preferably as a unit and being pinned, keyed or otherwise suitably fixed to said shaft for rotation therewith.

The spur gears 24, 24 and 25 are disposed in the bore 15 and the gears 24, 24 are respectively alined with the channels 20, 20 which, at their bottoms, intersect said bore, while the gear 25 is alined with the bore 16.

Slidably mounted in the bore 16 is a rack bar 26 which is in mesh with the spur gear 25 to be moved inwardly and outwardly by said spur gear, while slidably mounted in the channels 20, 20 are rack bars 27, 27, respectively, which are in mesh with the spur gears 24, 24, respectively, to be shifted vertically by said spur gears.

Disposed in the bore 17 is a plug 28 having a reduced inner end providing a stub shaft 29 on which is rotatably mounted a pinion 30 which is in mesh with the spur gear 25, while slidably mounted in the channel 18 is a rack bar 31 with which said pinion 30 also meshes. Accordingly, the spur gear 25 is effective to shift the rack bar 31 forwardly and rearwardly simultaneously with the rack bar 26. The plug 28 may be securely fastened in the bore 17 by a set screw or in any other suitable manner and is provided with top and side recesses to accommodate the adjacent portions of the adjacent spur gear 24 and the adjacent rack bar 27.

In the recesses 19, 19 are disposed a lower pair of cap arresting dogs 32, 32 and an upper pair of cap arresting dogs 33, 33. These dogs are of inverted L-shape having short, outwardly extending arms 34 at their tops and longer, downwardly extending arms 35, and they are pivoted, approximately at the intersection of their arms, on pins 36 carried by the block 14. The dogs of each pair are disposed in a common horizontal plane, one in one of the recesses 19 and the other in the other of said recesses, and each dog, at the lower end of its arm 35, carries a rearwardly extending cap-arresting pin 37. Suitable spring means tend constantly to rotate the dogs of each pair in directions such that their arms 35 are urged toward one another, and suitable stop means limit rotation of said dogs by said spring means. Therefore, the dogs of each pair have normal positions in which their pins 37, 37 are disposed closest together and from which they may be rotated against the yielding force exerted by said spring means to spread their pins 37, 37 farther apart. In the present instance the spring means referred to comprises a contractile coil spring 38 individual to each pair of the dogs connecting together the pins 37, 37 thereof, while the stop means referred to is comprised by the side faces of the rib 21. However, any other spring means may be employed to tend constantly to rotate the dogs in the directions stated and any other suitable stop means may be provided in lieu of the side faces of the rib 21.

Carried by the rack bars 27, 27 at the rear sides thereof are pawls 39, 39, respectively, which are disposed in the plane of the dogs 32 and which are pivoted intermediate their ends to said rack bars for inward and outward swinging movements of their upper and lower ends. Suitable spring means such, for example, as light expansion coil springs 40 interposed between the lower arms of said pawls 39 and blocks 41 fastened against the rear faces of the rack bars 27, tend constantly to rotate said pawls in directions to urge their upper arms inwardly and their lower arms outwardly, while suitable cam means such, for example, as vertically disposed cam strips 42 fastened against the rear face of the block 14 outwardly of the rack bars 27, 27, cooperate with said spring means to control rotation of said pawls in response to vertical movement of the same with the rack bars 27, 27.

The inner edges of the cam strips 42 constitute the cam faces of said strips and in this connection it will be noted by reference to Fig. 6 of the drawings that the inner edge of each strip 42 includes a vertically disposed portion 43 and, above this portion, a portion 44 which is inclined upwardly and inwardly therefrom.

A plate 45 is suitably fastened against the bottom face of the block 14 and serves to close the lower side of the channel 18 as well as the lower ends of the channels 20. Threaded in this plate are screws 46 which extend upwardly into the lower ends of the channels 20 and which constitute vertically adjustable stops engageable by the lower ends of the rack bars 27 to predetermine the lowermost limits of movement of said rack bars. Normally said rack bars are disposed at their lowermost limits of movement against said stops, and in this connection it is pointed out that the pawls 39 are mounted on said rack bars at locations such that the upper ends of their upper arms are disposed slightly below the outwardly extending arms 34 of the dogs 32 when said rack bars are at their lowermost limits of movement. It also is pointed out in this connection that when the rack bars 27 are disposed at their lowermost limits of movement the lower ends of the lower arms of the pawls 39 are engaged with the vertically disposed portions 43 of the cam edges of the strips 42 at points spaced below the inclined portions 44 of said cam edges. Furthermore, it is pointed out in this connection that when the lower ends of the lower arms of the pawls 39 are engaged with the vertically disposed portions 43 of the cam edges of the strips 42 the upper ends of the upper arms of said pawls are disposed in underlying relationship to the upper arms 34 of the dogs 32, and that when, by upward movement of said pawls with the rack bars 27, the outer faces of the lower arms of said pawls engage and move along the inclined portions 44 of the cam strips 42, pivotal movement thereby is imparted to said pawls in directions to swing their upper ends outwardly beyond the outer ends of the upper arms 34 of the pawls 32, not, however, until the pawls 39 have moved sufficient distances upwardly to effect, by the engagement of the upper ends of their upper arms with the arms 34 of the dogs 32, pivotal movements of said dogs in directions to swing their lower arms 35 outwardly and thus spread apart the cap arresting pins 37, 37 carried by said lower arms.

At or near their upper ends the rack bars 27, 27 are suitably provided with rearwardly extending projections 47 having inner side portions in the path of vertical movement of which the upper, outwardly extending arms 34 of the upper dogs 33 are disposed. When the rack bars 27 are in their lowermost positions the inner side portions of the projections 47 are disposed in underlying relationship to the upper arms 34 of the upper dogs 33. Accordingly, by upward movement of the rack bars 27 the inner side portions of the projections 47 are caused to engage the arms 34 of the dogs 33 and to rotate said dogs in directions to swing their lower arms 35 outwardly and thus spread apart the cap arresting pins 37, 37 carried by said lower arms. In this connection it is pointed out that the normal spacing of the projections 47 below the arms 34 of the upper dogs is greater than the normal spacing of the upper ends of the pawls 39 below the arms 34 of the lower dogs by an amount such that the lower dogs 32 first are swung and then are released by the pawls 39 to be returned to their normal positions by their associated spring means prior to the upper dogs being swung by the projections 47.

A plate 48 is fastened against the top of the block 14 and serves to close the upper ends of the recesses 19 and the channels 20, and a plate 49 is fastened against the rear face of said block and serves both as a cover for the described operating parts located at the rear of said block as well as a base to be fastened to a capping machine for the purpose of operatively mounting the marking mechanism thereon.

Extending through the plate 49 are slots 50 which accommodate the pins 37, while in the inner face of said plate are channels 51 which accommodate the springs 38. Also extending through the plate 49 is an opening 52 which is alined with and constitutes a continuation of the bore 16, while above and below said opening 52 and in vertical alinement therewith said plate is provided at its rear side with vertically disposed ribs 53 of a width corresponding to the width of the usual sight slot 54 in the front wall of the cap chute 12. Moreover, said plate has extending therethrough a vertical slot 55 which registers at its lower end with the rear end of the channel 18 and which accommodates an upward extension 56 of the rack bar 31 at the rear end of said rack bar.

One end of the shaft 23 extends through and projects beyond the related bearing member 22 and has fixed thereon a shaft rotating arm 57 and loose thereon for rotation with respect thereto, a lever 58 for swinging said arm 57 and thereby rotating said shaft.

The lever 58 is rotatably mounted intermediate its ends on the shaft 23 and includes an arm 59 extending downwardly from said shaft and an arm 60 extending preferably upwardly from said shaft and having a pair of spaced lugs 61, 61 between which the free or upper end portion of the arm 57 is disposed. Between one side of said arm 57 and one of said lugs is interposed a coil spring 62, while threaded in the other of said lugs is an adjustable screw 63 the inner end of which constitutes a stop against which the other side of said arm normally bears. The spring 62 is associated with the lug 61 through which the lever 58 acts to swing the arm 57 in a direction to effect forward movement of the rack bar 26, while the stop screw 63 is associated with the lug through which said lever acts to shift the rack bar 26 rearwardly.

Figures 2, 3:
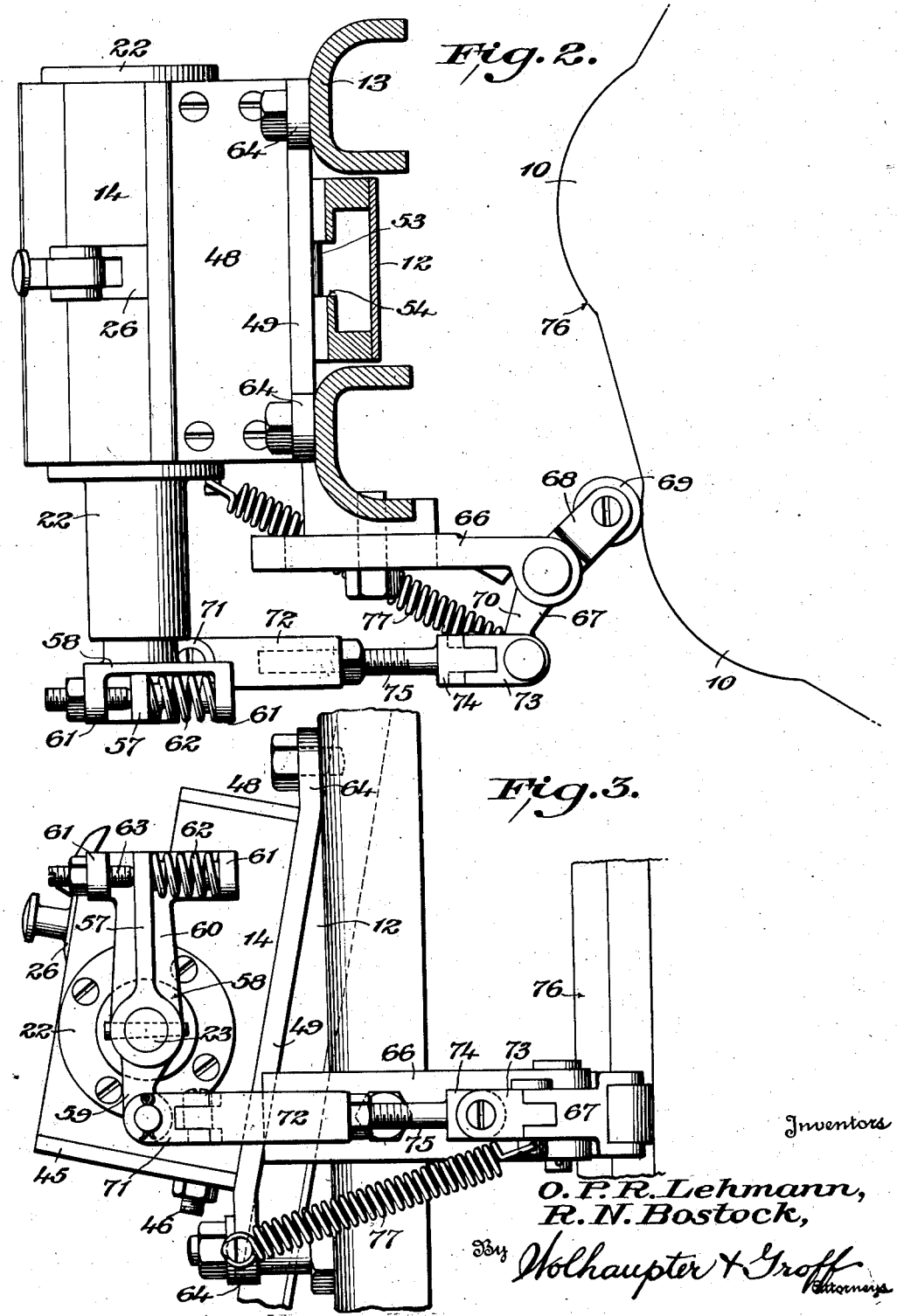
Figure 2 is a horizontal section on the line 2—2 of Fig. 1.
Figure 3 is an enlarged side elevation of the cap marking mechanism.

The plate 49 is provided at its top and bottom with apertured lugs 64 to accommodate bolts 65 for fastening the marking mechanism B operatively upon a capping machine, and in this connection it will be noted that in the present instance and by way of example the mechanism B is fastened to the bracket 13 of the machine A in a position such that the plate 49 is disposed against the outer face of the cap chute 12 with the ribs 53 of said plate disposed in the sight opening 54 of said chute so as to assist in holding the mechanism B properly positioned relative to said chute. Further in this connection it will be observed by reference to Fig. 2 of the drawings that a bracket arm 66 is fastened to the bracket 13 and that said bracket arm has pivoted thereto, intermediate its ends, a lever 67 one arm 68 of which is provided with a cam follower roller 69 and the other arm 70 of which is connected with the arm 59 of the lever 58 so that rocking movements of said lever 67 are transmitted to said lever 58.

The lever 58 is rockable in a vertical plane. On the other hand, lever 67 is rockable in a horizontal plane. Therefore, an articulated connection is provided between the arms 59 and 70 of said levers so as to permit free transmission of movement of said levers to each other. In the present instance this connection comprises a block 71 pivoted to the arm 59 for vertical swinging movement relative thereto, a block 72 pivoted to said block 71 for horizontal swinging movement relative thereto, a block 73 pivoted to the arm 67 for horizontal swinging movement relative thereto, a block 74 pivoted to the block 73 for vertical swinging movement relative thereto, and a stem 75 connecting the blocks 72 and 74.

The stem 75 is carried by the block 74 and is threaded into the block 72 so that the effective length of the connection between the arms 59 and 70 of the levers 58 and 67 may be varied, while the bracket arm 66 is longitudinally slotted to accommodate the bolt or bolts by which said arm is fastened to the bracket 13 so that said bracket arm may be longitudinally adjusted to bring the cam follower roller 69 of the lever 67 into proper cooperative relationship to suitable cam means 76 for effecting rocking movement of said lever 67 in one direction. This cam means may be comprised, for example, by the outer side faces of the capping heads 10 or by a cam ring fastened to the heads 10, for rotation therewith.

As the capping heads 10 rotated, the lever 67 is intermittently rocked by each of said heads or by a high part of the cam means individual to each of said heads, and in this connection the arrangement is such as shown that the movement imparted to the lever 67 by the cam means 76 is in a direction to produce forward movement of the rack bar 26. On the other hand, suitable spring means 77 tends constantly to swing the lever 67 in a direction to urge the cam follower roller 69 thereof toward the cam means 76 and to produce rearward movement of the rack bar 26.

The rack bar 26 is hollow and contains a marking element 78 the rear end of which extends through the rear end of said rack bar and is provided with a suitable marking character 79. By any suitable means, such as a latch 80, the marking element 78 is retained in the rack bar 26 for movement therewith and so that it may readily be removed and replaced by another marking element having a different marking character 79.

When the marking mechanism B is operatively mounted upon a capping machine A in the manner shown the cap arresting pins 37 project into the cap chute 12 for cooperation with caps 81 which are fed from the hopper 11 through said chute to the capping heads 10, the front of the chute 12 being suitably recessed if necessary to accommodate said pins 37.

When the arms 35, 35 of either pair of the dogs 32 or 33 are at their limits of movement toward one another the distance between their pins 37, 37 is less than the diameter of a cap 81. Thus, when the arms 35, 35 of either pair of said dogs are at their limits of movement toward one another their pins 37, 37 act as stops to arrest downward movement of caps 81 gravitating through the chute 12. On the other hand, the amount of outward movement imparted to the arms 35, 35 of each pair of the dogs 32 and 33 by upward movement of the rack bars 27 is such that the pins 37, 37 of said arms are spread apart sufficiently to permit the caps 81 to gravitate therebetween.

The pins 37, 37 of the lower pair of dogs 32 are located relative to the marking element 78 so that when a cap 81 is arrested and held by the pins of said lower pair of dogs the cap is positioned in alinement with said marking element 78.

The operation of the mechanism is as follows: Each time a high part of the cam means 76 cooperates with the roller 69 the lever 67 is rocked in a direction to rotate the lever 60 and the arm 57 in a direction to impart forward or retractile movement to the rack bar 26 and the marking element 78 carried thereby, the spring 62 between the lever 60 and the arm 57 acting as a cushion to relieve the mechanism of shock, while each time a high part of the cam means passes the roller 69 the spring means 77 acts to impart rearward or cap marking movement to the marking element 78. Moreover, each time the marking element 78 is moved forwardly or retracted the rack bars 27, 27 are moved upwardly, while each time the marking element 78 is moved rearwardly to effect marking of a cap the rack bars 27, 27 are moved downwardly.

Assuming that the rack bars 27, 27 are disposed in their lowermost positions; that a cap 81 is supported by the pins 37, 37 of the lower pair of dogs 32 in alinement with the marking element 78; that a second cap 81 is supported by the pins 37, 37 of the upper pair of dogs 33, and that the marking element 78 is in its rearmost or cap marking position to which it has been moved by the spring means 77 following release of the lever 67 as a result of a high part of the cam means 76 having passed the roller 69, the parts remain in said positions until the next high part of the cam means 76 cooperate with the roller 69. Thereupon the marking element 78 is retracted and the rack bars 27, 27 are moved upwardly. As a result of initial upward movement of the rack bars 27 the pawls 39 act to swing the lower pair of dogs 32 to move their pins 37 apart and permit the marked cap 81 held by said pins to pass between said pins and gravitate to the lower end of the chute 12. Continued upward movement of the rack bars 27 then results, first, in the pawls 39 releasing the dogs 32 to return to their normal cap arresting positions under the influence of their associated spring 38 and, second, in actuation of the upper pair of dogs 33 by the projections 47 to move the pins 37 of said upper pair of dogs apart to permit the cap held thereby to drop to the pins 37 of the lower pair of dogs 32 to be held by the latter in position to be marked.

Following the foregoing operations the high part of the cam means 76 passes the roller 69 and the latter is released, permitting the spring means 77 to operate to move the marking element 78 rearwardly to effect marking of the cap 81 now held by the pins 37 of the lower pair of dogs 32, and to move the rack bars 27 downwardly. Upon downward movement of the rack bars 27 the projections 47 recede from the arms 34 of the dogs 33 to permit said dogs to return to their normal positions to arrest the next cap 81 delivered from the hopper 11, and the pawls 39 ride over the arms 34 of the lower pair of dogs 32 and return to their initial positions below said dogs 32.

The caps 81 are provided as usual with sealing pads 82 and marking of said caps is effected by the character 79 at the inner end of the marking element 78 upon these pads.

From the foregoing it will be apparent that for each rotative movement of the capping heads 10 corresponding to the angle between adjacent heads a cap is delivered to the marking mechanism, a cap is marked and a marked cap is delivered from the marking mechanism through the chute 12 to a position to be applied to a bottle or can. In this connection, if, for any reason, caps should accumulate in the chute 12 below the marking mechanism B they might act to prevent caps from dropping from marking position, and in that event a cap held in position to be marked might undesirably be subjected to repeated markings in the absence of means to prevent such repeated markings. In this connection it is apparent that the rack bar 31 moves forwardly and rearwardly in harmony with the marking element 78 and that the upward extension 56 at the rear end of said rack bar 31 serves as a means for engagement with the top cap of an accumulation of caps in the lower portion of the chute 12 to stop rearward movement of the marking element 78 before it has reached marking position. Thus, no cap will be marked more than once even though the marking mechanism may be operated repeatedly while there is an accumulation of caps in the lower portion of the chute 12 preventing feeding of caps from the marking mechanism.

The invention contemplates the use of a marking element 78 individual to each different person in charge of any given machine. In other words, when any given person assumes charge of a machine that person will substitute his special marking element 78 in lieu of the marking element employed by the person previously in charge of the machine which, in accordance with the invention, may be effected in a quick, facile manner. Thus, mere reference subsequently to any given cap will serve to identify not only the machine which filled and capped any given bottle or can, but the person in charge of the machine when the particular bottle or can was filled and capped.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

We claim:

1. In a container capping machine including a cap delivery chute and movable capping means having cam means movable therewith, means controlled by said cam means for temporarily arresting each cap as it moves through said chute and for then releasing the same to continue its movement through said chute, means also controlled by said cam means for applying an identifying mark to each cap while it is temporarily arrested, and other means also controlled by said cam means for preventing repeated marking of any given cap in the event of an accumulation of caps in said chute preventing movement of caps through said chute from the position in which they are arrested and marked.

2. In a container capping machine including a cap delivery chute and movable capping means having cam means movable therewith, a mechanism mounted in operative relationship to said chute and two pairs of cap arresting pins projecting into said chute, means operable under the control of said cam means to move the pins of each pair toward and away from each other at different times to temporarily arrest each cap as it moves through said chute and then to release same to continue its movement through said chute, and means also operating under the control of said cam means to apply an identifying mark to each cap while it is temporarily arrested.

3. In a container capping machine including a cap delivery chute and movable capping means having cam means movable therewith, a mechanism mounted in operative relationship to said chute and including cap arresting pins projecting into said chute, means including reciprocal rack bars for moving said pins to temporarily arrest each cap as it moves through said chute and then to release same to continue its movement through said chute, a reciprocable marking element projectable into and retractable from said chute under the control of said cam means and effective when projected to apply an identifying mark to each cap while it is temporarily arrested, and gear means operating under the control of said cam means to reciprocate said rack bars.

4. In a container capping machine including a cap delivery chute and movable capping means having cam means movable therewith, means operating under the control of said cam means to temporarily arrest each cap as it moves through said chute and then to release same to continue its movement through said chute, a rack bar reciprocable under the control of said cam means, and a marking element removably replaceably carried by said rack bar and projectable into and retractable from said chute by said rack bar and effective when projected to apply an identifying mark to a cap while the same is temporarily arrested in its movement through said chute.

5. In a container capping machine including a substantially vertically disposed cap delivery chute and movable capping means having actuating means movable in harmony therewith, upper and lower pairs of laterally spaced apart cap arresting pins projecting into said chute, means operable under the control of said actuating means to move the pins of each pair toward and away from each other in proper sequence to temporarily arrest each cap as it moves downwardly through said chute, a reciprocable marking element projectable into and retractable from said chute and effective when projected to apply an identifying mark to each cap while same is temporarily arrested in its movement through said chute, and rack bar and gear means operable under the control of said actuating means to move said pins and to reciprocate said marking element.

6. In a container capping machine including a cap delivery chute and capping means, means for temporarily arresting each cap delivered through said chute and for then releasing the same to continue its movement through said chute, means for applying an indentifying mark to each cap while it is temporarily arrested, and other means for preventing repeated marking of any given cap in the event of an accumulation of caps in said chute preventing movement of caps through said chute from the position in which they are arrested and marked.

7. In a container capping machine including capping means and a substantially vertically disposed chute through which caps gravitate to said capping means, a cap marking mechanism mounted in operative relationship to said chute and including upper and lower pairs of laterally spaced apart pins projecting into said chute, means mounting the pins of each pair for lateral movement toward each other to arrest a cap descending through said chute and for movement away from each other to release an arrested cap to descend through said chute, means for operating said pairs of pins alternately to temporarily arrest the descent of each cap through said chute in a position to be marked, and means for marking each cap while same is in its arrested position.

8. In a container capping machine as set forth in claim 7, pivoted dogs carrying the cap arresting pins, and reciprocable members cooperating with said pivoted dogs to swing same to effect movement of the pins of each pair toward and away from each other.

9. In a container capping machine including capping means and a chute for the delivery of caps to said capping means, means for temporarily arresting the movement of each cap passing through said chute to said capping means, an indexed element for marking each cap while same is in its arrested position, a movable carrier for said marking element, means for moving said carrier thereby to move said marking element to and from cap marking position, and means mounting said marking element upon said carrier for quick and ready removal therefrom and for quick and ready replacement by another marking element having a different marking index.

OTTO P. R. LEHMANN.
RAYMOND N. BOSTOCK.